(12) United States Patent
Drouin et al.

(10) Patent No.: US 9,942,360 B2
(45) Date of Patent: Apr. 10, 2018

(54) SYSTEM AND METHOD FOR DIGITAL TOKEN EXCHANGE AND DELIVERY

(71) Applicant: Unity IPR ApS, Copenhagen K (DK)

(72) Inventors: Sylvio Herve Drouin, San Francisco, CA (US); Colin James Alleyne, Pierrefonds (CA)

(73) Assignee: Unity IPR ApS, Copenhagen (DK)

( * ) Notice: Subject to any disclaimer, the term of this patent is extended or adjusted under 35 U.S.C. 154(b) by 0 days.

(21) Appl. No.: 15/676,753

(22) Filed: Aug. 14, 2017

(65) Prior Publication Data

US 2018/0048735 A1 Feb. 15, 2018

Related U.S. Application Data

(60) Provisional application No. 62/374,469, filed on Aug. 12, 2016.

(51) Int. Cl.
| | |
|---|---|
| *G06F 15/16* | (2006.01) |
| *H04L 29/06* | (2006.01) |
| *H04L 29/08* | (2006.01) |
| *G06T 19/00* | (2011.01) |

(52) U.S. Cl.
CPC .......... *H04L 67/38* (2013.01); *G06T 19/006* (2013.01); *H04L 63/0428* (2013.01); *H04L 67/18* (2013.01)

(58) Field of Classification Search
CPC ...... H04L 67/38; H04L 67/18; H04L 63/0428
USPC ................................................. 709/217, 223
See application file for complete search history.

(56) References Cited

U.S. PATENT DOCUMENTS

| | | | | |
|---|---|---|---|---|
| 2002/0188678 | A1* | 12/2002 | Edecker | H04L 29/12066 709/204 |
| 2011/0246276 | A1* | 10/2011 | Peters | G06Q 30/02 705/14.24 |
| 2012/0060226 | A1* | 3/2012 | Park | G06F 21/6209 726/28 |
| 2013/0179576 | A1* | 7/2013 | Boldyrev | H04L 47/70 709/226 |
| 2015/0206329 | A1* | 7/2015 | Devries | G06T 11/00 345/633 |
| 2015/0206349 | A1* | 7/2015 | Rosenthal | H04N 21/41407 345/633 |
| 2017/0330034 | A1* | 11/2017 | Wang | G06K 9/00671 |

* cited by examiner

*Primary Examiner* — Philip B Tran
(74) *Attorney, Agent, or Firm* — Schwegman Lundberg & Woessner, P.A.

(57) ABSTRACT

A system includes hardware processors and a token exchange module configured to create a uniquely identified first digital token including an owner ID field identifying the current possessor of the digital token, associate the first digital token with digital content presented to the first user in a mixed reality environment, present the digital within the MR environment, make the first digital token available for acquisition, receive a request to acquire the first digital token, assign possession of the first digital token, via the owner ID field, to the first unique user ID of the first user based on the request to acquire the first digital token, receive a request to transfer the first digital token from the first user to the second user, the second user having a second unique user ID, and changing the owner ID field to the second unique user ID based on the request to transfer.

20 Claims, 9 Drawing Sheets

SYSTEM AND METHOD FOR DIGITAL TOKEN EXCHANGE AND DELIVERY

RELATED APPLICATIONS

This application claims the benefit of priority to U.S. Provisional Patent Application Ser. No. 62/374,469, filed Aug. 12, 2016, herein incorporated by reference in its entirety.

TECHNICAL FIELD

The present disclosure relates to the field of mixed reality environments and, more particularly, to digital tokens linked to virtual or physical objects in mixed reality environments.

BACKGROUND

There are currently no known ways to assign objects (both physical and virtual) to unique identifiers and allow those objects to be altered, transferred, swapped, exchanged, traded, given, and associated with a location. There is no common platform or standard of understanding on how this could be done across users, applications and environments where the tokens and their associated objects can then be manipulated by applications or users in order to form collections and trigger events based on object transformations.

BRIEF DESCRIPTION OF THE DRAWINGS

Various ones of the appended drawings merely illustrate example embodiments of the present disclosure and cannot be considered as limiting its scope, and in which.

The headings provided herein are merely for convenience and do not necessarily affect the scope or meaning of the terms used. Like numbers in the Figures indicate like components.

Figure 1:
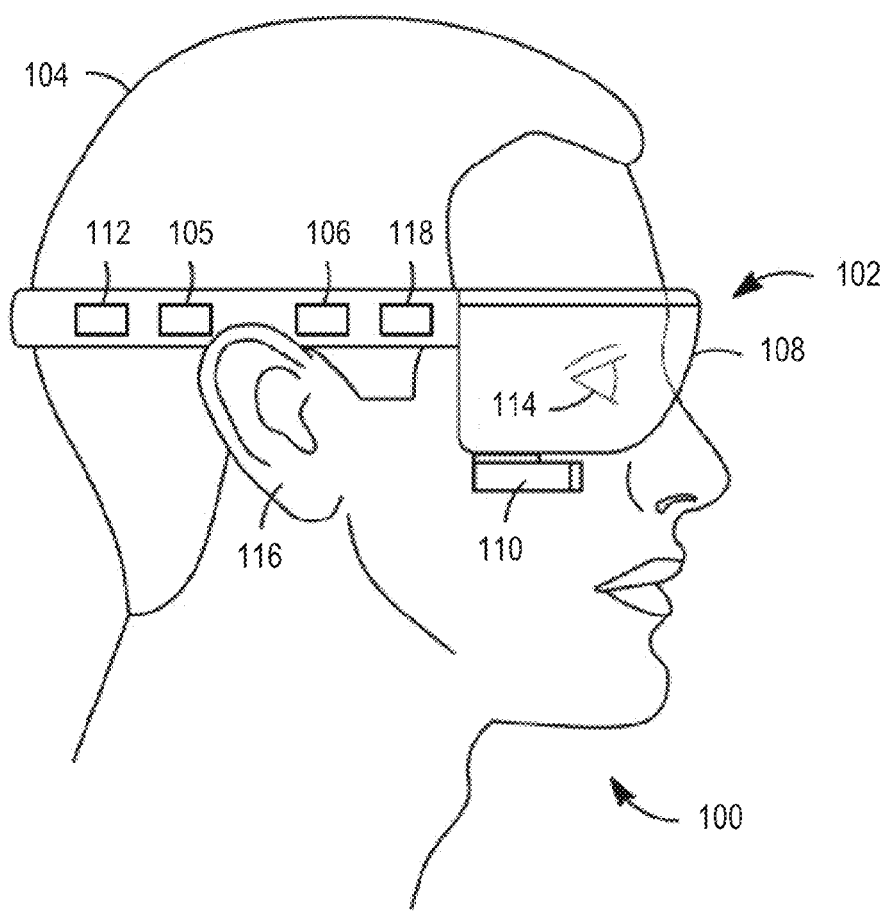
FIG. 1 is a diagram of an example head-mounted display (HMD) worn by a user.

In the description below, the term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

DETAILED DESCRIPTION

The description that follows describes systems, methods, techniques, instruction sequences, and computing machine program products that constitute illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

A system is described herein that provides digital objects in a mixed reality (MR) environment (e.g., in a virtual reality (VR), augmented reality (AR), or other simulated real-world environments, such as 2-dimensional (2D) or 3-dimensional (3D) gaming environments). Some digital objects may represent or otherwise be associated with real-world objects such as, for example, real-world locations (e.g., a restaurant or merchant location, a sports stadium, a particular geolocation), people (e.g., users, mobile computing devices of users), or real-world objects (e.g., trading cards, vehicles, computing devices). Some digital objects may represent virtual objects such as, for example, objects used in a computer game (e.g., a sword, a sacred stone). Some digital objects may be AR objects that users experience in an AR environment (e.g., AR content provided by a merchant at a retail location). The term "token" is used herein to refer to such digital objects.

In example embodiments, the digital objects may interact with each other in location, time, and state. Furthermore, the system defines the transformation of a digital object's state and properties over time. The digital objects may be collected and exchanged by end users. Some digital objects may be consumed, viewed, previewed, transformed, and interacted with by a user via a local device, such as a mobile computing device (e.g., mobile phone, head-mounted display for VR or AR). Each digital object includes a unique token identifier. The unique token identifier acts as a proxy to the object itself. Some digital objects may be associated with real-world objects. Digital objects can be presented either in a virtual environment (e.g., such as a 2D or 3D game on a 2-dimensional screen, or VR via a head mounted display), or they can be presented to the user in an augmented reality environment (e.g., via a head mounted display, a smartphone).

In some example embodiments, the system creates and uses unique identifiers included within tokens which may be linked to digital content and the delivery of the identifiers via networked communication (e.g., with a mobile computing device of a user). Such tokens may be exchanged between users via electronic user devices. The system may also modify aspects of the tokens over time (e.g., changing content, properties over time via transform properties). Some tokens and their associated content can be duplicated and transforms can be used to evolve the duplicated content differently over time. A user can access a plurality of tokens on a server using a device. This plurality of tokens includes tokens that the user owns, tokens that are broadcasted by other users, and tokens that are floating.

The term "token," as used herein, refers to a digital data entity that may be associated with various types of objects (e.g., virtual objects in a 2D or 3D virtual environment, VR objects in a VR environment, AR objects overlaid onto a real-world environment, or real-world objects). Tokens may include data such as, for example, a unique identifier, one or more object attributes, one or more object states, links to one or more users (e.g., an owner via a user profile) or groups (e.g., which may act as a user), one or more inbound links from one or more tokens, zero or more outbound links to other tokens, and a link to an entity of content including a physical object or digital content. The term "token content," as used herein, represents the content associated with a token (e.g., the entity of content). For example, a token may have token content such as pictures, videos, digital characters, or physical cards. In some embodiments, some of the token content may be associated with a media franchise, trading cards, game cards, sports cards, and the like (e.g., images, statistics, character attributes, and so forth). As such, the token may be considered, in one sense, as a pointer or reference to the token content. In other words, since a token has a unique identifier and is linked to token content, it can be said that the token is a unique identifier of the token content. The term "transform function," as used herein, refers to an operator that modifies a token in some way. This modification can be a modification of any part of the token including, for example, a modification of the unique identifier, one or more attributes, one of more states, the token content, and the associated user.

In some example embodiments, a token includes a unique identifier that references digital media content (e.g., a virtual object) or a physical object (e.g., an object or a location within the real world). In many of the example embodiments provided herein, tokens are described as referencing digital media content. However, it should be understood that tokens may also reference physical objects or locations. In some embodiments, multiple tokens may reference the same token content even though each of the tokens have a unique identifier. Token content may be consumed by a user (e.g., viewed, listen to, felt, or otherwise interacted with) during a session (e.g., during game play). In some embodiments, a session may be a communication session between at least one server and an electronic user device or between multiple electronic user devices.

FIG. 1 is a diagram of an example head-mounted display (HMD) 102, worn by a user (or "wearer") 100. In the example embodiment, the user 100 (e.g., a game developer or game player) experiences a VR environment or augmented reality (AR) content (e.g., a mixed reality environment) while wearing the HMD 102. In the example embodiment, the HMD device 102 may include an opaque visor 108 which may obscure the wearer 100's view of the real world, and which may display a complete virtual environment to the wearer 100. In other embodiments, the HMD device 102 includes a transparent or semi-transparent visor (or "lens", or "lenses") 108 through which the wearer 100 views their surroundings (also herein referred to also as "the real world"). It should be understood that the visor 108 is illustrated in FIG. 1 as transparent for purposes of illustration but, as described above, the visor 108 may be opaque in some embodiments.

In the example embodiment, the HMD 102 also includes a display device 118 that renders graphics (e.g., virtual objects) onto the visor 108. As such, the visor 108 acts as a "screen" or surface on which the output of the display device 118 appears, and through which the wearer 100 experiences virtual content. In some embodiments, the HMD 102 may present two different projections via the visor (e.g., one for each eye). The display device 118 is driven or controlled by one or more GPUs 106 or holographic projection units (HPUs). The GPU 106 processes aspects of graphical output that assists in speeding up rendering of output through the display device 118.

In the example embodiment, the HMD device 102 also includes one or more central processing units (CPUs) 105 that may execute some of the operations and methods described herein. The HMD device 102 also includes an audio device 112 (e.g., speakers, not separately depicted) that is configured to present audio output to the wearer 100 (e.g., via ears 116 of the user 100). While not separately shown, the HMD device 102 also includes wired or wireless network adapters (e.g., Wi-Fi, Bluetooth, cellular) that facilitate communication between the HMD and other computing devices described herein.

In some embodiments, the HMD device 102 includes a digital camera device 110. The digital camera device (or just "camera") 110 is a forward-facing video input device that is oriented so as to capture at least a portion of a field of view (FOV) of the wearer 100. In other words, the camera 110 captures or "sees" an angle of view of the real world based on the orientation of the HMD device 102 (e.g., similar to what the wearer 100 sees in the wearer 100's FOV when looking through the visor 108). The camera devices 110 may be configured to capture real-world digital video around the user 100 (e.g., a field of view, a peripheral view, or a 360° view around the wearer 100). The camera devices 110 may be used to capture digital video of the real world environment around the user 100. In some embodiments, output from the digital camera device 110 may be projected onto the visor 108 (e.g., in opaque visor embodiments), and may also include additional virtual content (e.g., added to the camera output). In some embodiments, the camera 110 may be a depth camera, or the HMD device 102 may otherwise include a depth sensor, capturing depth information for objects within the FOV of the user 100.

In some embodiments, the HMD device 102 may include one or more sensors (not separately shown), or may be coupled in wired or wireless communication with the sensors (e.g., via near-field communication (NFC) with a wrist-wearable device also worn by the wearer 100). For example, the HMD 102 may include motion or position sensors configured to determine a position or orientation of the HMD 102 or position of nearby real-world objects. In some embodiments, the HMD device 102 may include a microphone for capturing audio input (e.g., spoken vocals of the user 100).

In some embodiments, the HMD 102 may be similar to virtual reality HMDs such as the Oculus Rift™, The HTC Vive™, The Playstation VR™, and the like. In some embodiments, the HMD 102 may be similar to augmented reality HMDs such as Google Glass®, Microsoft HoloLens®, Magic Leap™ HMD, Meta™ HMD and so forth. In some embodiments, the HMD 102 may also include one or more sensors (not shown), such as a global positioning system (GPS) receiver (e.g., for determining a GPS location of the user device 102), biometric sensors (e.g., for capturing biometric data of the user 100), motion or position sensors (e.g., for capturing position data of the user 100 or other objects), a depth camera (e.g. using LIDAR), or an audio microphone (e.g., for capturing sound data). Some sensors may be external to the HMD 102, and may be configured to wirelessly communicate with the HMID 102 (e.g., such as used in the Microsoft Kinect®, Vive Tracker™, MIT's Lidar sensor, or MIT's wireless emotion detector).

In some embodiments, the user 100 may hold one or more hand tracking devices ("handhelds") (not separately shown in FIG. 1) (e.g., one in each hand). The handhelds provide information about the absolute or relative position and orientation of a user's hands and, as such, are capable of capturing hand gesture information. The handhelds may be configured to operate directly with the HMD 102 (e.g., via wired or wireless communication). In some embodiments, the handhelds may be Oculus Touch™ hand controllers, HTC Vive™ hand trackers, or Playstation VR™ hand controllers. The handhelds may also include one or more buttons or joysticks built into the handheld. In other embodiments, the user 100 may wear one or more wearable hand tracking devices (e.g., motion tracking gloves, not shown), such as those made commercially available by Manus VR (Netherlands). In still other embodiments, hand motion of the user 100 may be tracked without, or in addition to, the handhelds or wearable hand tracking devices via a hand position sensor (not shown, e.g., using optical methods to track the position and orientation of the user's hands) such as, for example, those made commercially available by Leap Motion, Inc. (a California corporation). Such hand tracking devices (e.g., handhelds) track the position one or more of the hands of the user during operation.

During operation, in the example embodiment, the HMD 102 is mounted on a head 104 of the wearer, and over both eyes 114 of the wearer 100, as shown in FIG. 1. The wearer 100 may be presented with a virtual environment or a mixed reality environment which may be experienced via the HMD 102 and handhelds as described herein. Further, a token exchange system (not separately shown in FIG. 1) is used in conjunction with the HMD 102, as described herein.

Figure 2:
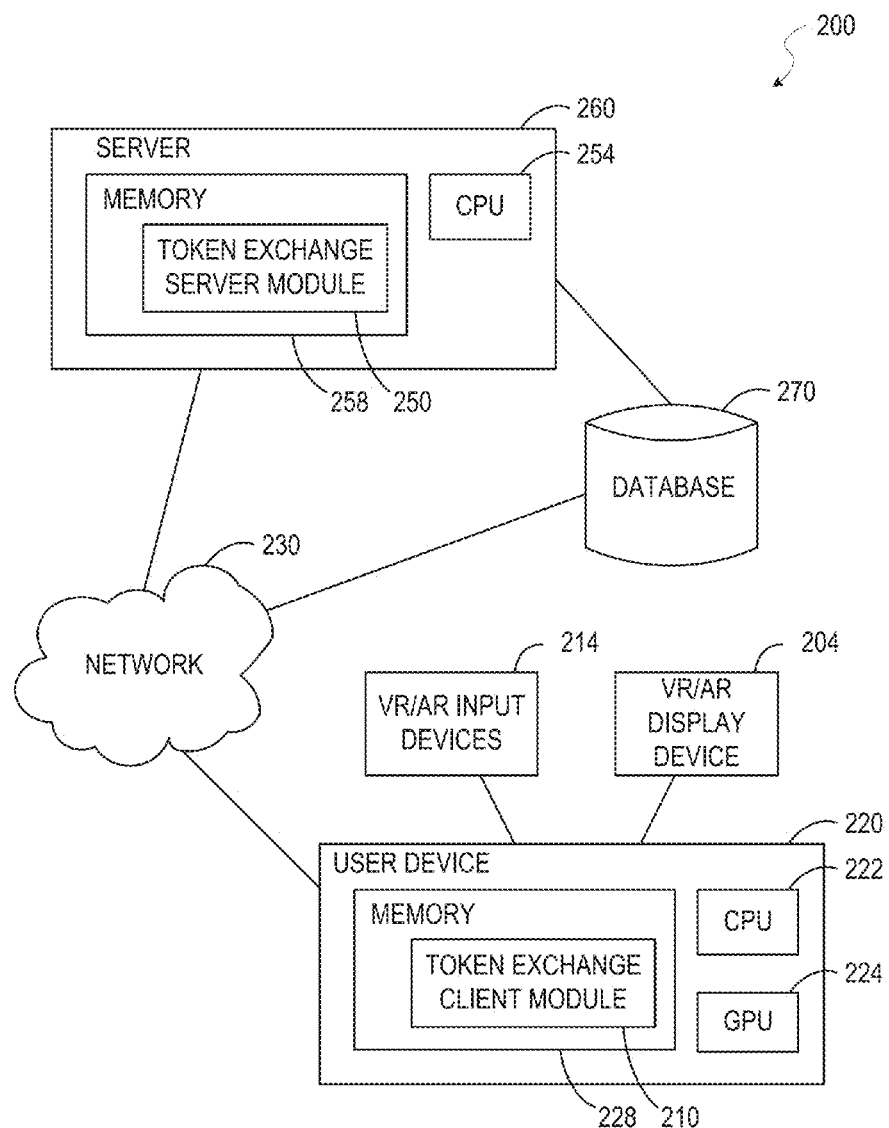
FIG. 2 is a component diagram of a token exchange system that may include components similar to the HMD and the handhelds described with respect to FIG. 1.

FIG. 2 is a component diagram of a token exchange system 200 that may include components similar to the HMD 102 and the handhelds described with respect to FIG. 1. In the example embodiment, the token exchange system 200 includes a user device 220, a server device 250, and a database 270 coupled in networked communication via a network 230 (e.g., the Internet). The user device 220 includes an MR display device 204, a memory 228, one or more CPUs 222, and one or more GPUs 224, and may include one or more MR input devices 214 (e.g., handhelds, sensors). In some embodiments, the user device 220 may be similar to the HMD 102, the MR display device 204 may be similar to the visor 108, and the MR input device(s) 214 may be similar to the handhelds or other tracking devices described above in reference to FIG. 1. In some embodiments, the CPU 222 may be similar to the CPU 104, the GPU 224 may be similar to the GPU 106, and the user device 220 may be a part of the HMD 102.

In the example embodiment, the user device 220 also includes a token exchange client module 210 that is executable by the CPU 222 and/or the GPU 224. The token exchange client module 210 is configured to provide a virtual reality environment (e.g., a VR environment, an AR environment, or other simulated environments, such as 2D or 3D gaming environments, any of which may be representative of the real world). In the example embodiment, the virtual environment is an MR environment provided through the MR display device 204 (e.g., to the user 100). In other embodiments, the virtual environment may be provided via the HMD 102 configured to provide VR content, or via conventional 2D displays such as on a smartphone, tablet, or desktop computer. The token exchange client module 210 provides various aspects of token exchange actions for the user 100 within the MR environment, as described herein. The token exchange client module 210 includes computer-executable instructions residing in the memory 228 that are executed by the CPU 222 and optionally with the GPU 224 during operation. The token exchange client module 210 communicates with the MR display device 204 (e.g., the HMD 102) and also with other MR hardware such as the MR input device(s) (e.g., motion capture devices such as the handhelds 214).

In the example embodiment, the server 260 includes a memory 258, one or more CPUs 254, and a token exchange server module 250. The token exchange server module 250 is executed by the CPU 254 and is configured to provide various aspects of token exchange actions for the user 100 within the MR environment as described herein. The token exchange server module 250 includes computer-executable instructions residing in the memory 258 that are executed by the CPU 254 during operation. The token exchange server module 250 communicates with the token exchange client module 210 on the user device 220 via the network 230.

In some embodiments, the token exchange system 200 and the various associated hardware and software components described herein may provide VR content and functionality instead of, or in addition to, AR content, or may provide digital content and functionality for 2D or 3D environments such as gaming environments. It should be understood that the systems and methods described herein may be performed with VR content, or within 2D and 3D gaming environments and, as such, the scope of this disclosure covers any such applications.

Figure 3:
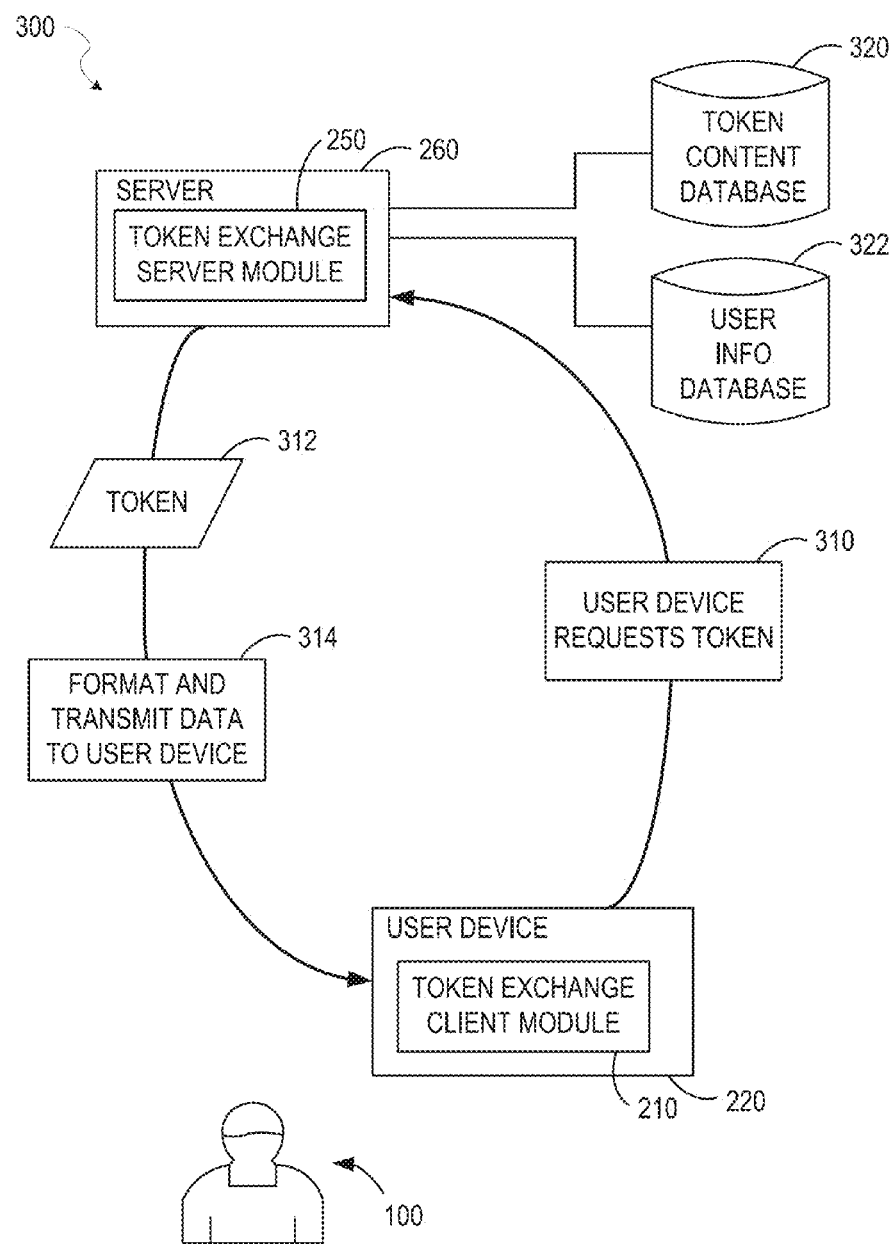
FIG. 3 is a data flow diagram involving components of the token exchange system, illustrating a token acquisition process for an example token between the server device and the user device.

FIG. 3 is a data flow diagram 300 involving components of the token exchange system 200, illustrating a token acquisition process for an example token 312 between the server device 260 and the user device 220. In the example embodiment, the user 100 operates the user device 220 (e.g., a mobile phone, the HMD 102) that contains the token exchange client module 210. The token exchange client module 210 runs on the user device 220 and connects to and communicates with the server 260. The token 312 represents a digital object provided by the token exchange system 200.

In the example embodiment, the token exchange client module 210 makes a request ("token request") to the server 260 for access to the token 312 and related content (see operation 310). The server 260 accesses a token content database 320 each of which includes information about tokens and token content, and a user information database 322 which includes various information about users such as the user 100 (e.g., user profile information and information on the tokens a user has access to via ownership, viewing, and so forth). The databases 320, 322 may be similar to the database 270. The token content database 320 may include, for example, a joint user-to-tokens table (e.g., a "one-to-many" table).

In the example embodiment, the server 260 processes the token request with data from the databases 320, 322. More specifically, the token exchange server module 250 checks to ensure that the user 100 on the user device 220 has permission to access the requested token 312 and associated token content. To determine permission, the token exchange server module 250 accesses a user profile for the user 100 from the user information database 322. If the user 100 has permission to access the token 312, then the server 260 extracts the requested token 312 and associated token content from the databases 320, 322, and may format the token 312 or various token content for display on the user device 220 where the user 100 can interact with the requested token content (see operation 314).

In some embodiments, the token exchange system 200 provides a process for duplication of token content (e.g., the token content associated with the token 312). Token duplication includes the creation of a second token (not separately shown) that is linked with the first token 312, and duplication of one or more token content elements of the content of the first token 312 to create content of the second token (e.g., a separate copy that may diverge from the first token content over time). In some embodiments, the duplication process can be triggered by the user device 220 (e.g., by the user 100), but may be executed and controlled by one or more server processes (e.g., within the token exchange server module 250). Such server-based control provides an enhanced security environment in which some or all actions are controlled by the token exchange server module 250 in order to, for example, control (e.g., limit) access to token data and the actions taken thereon.

In other embodiments, the duplication process can be triggered by the user device 220 and may be executed and controlled by one or more local client processes (e.g., by the token exchange client module 210), which may then communicate with one or more server processes (e.g., within the token exchange server module 250). Some such duplicate tokens may contain a link to the original token and, by extension, access to the original token content and token properties (e.g., ownership). In some embodiments, duplicated tokens and their associated token content can be modified. In some embodiments, the original token content may not be initially copied, but the link may be used by the second token to access the original token content whenever token content is needed. If token content for the second token is subsequently changed, the token exchange system 200 may then create a duplicate of the original token content for the second token, thereby allowing the second token content to diverge from the original token. For example, the duplicate token may include a link to the original token, plus optionally any changed data elements. As such, for any changed data elements, the duplicate token may reference the changed data elements directly, and for any unchanged data elements of the duplicate token, the duplicate token may reference the original data elements of the original token. This method of token duplication may also allow a duplicate token to record the history of the token content within the duplicate token.

Figure 4:
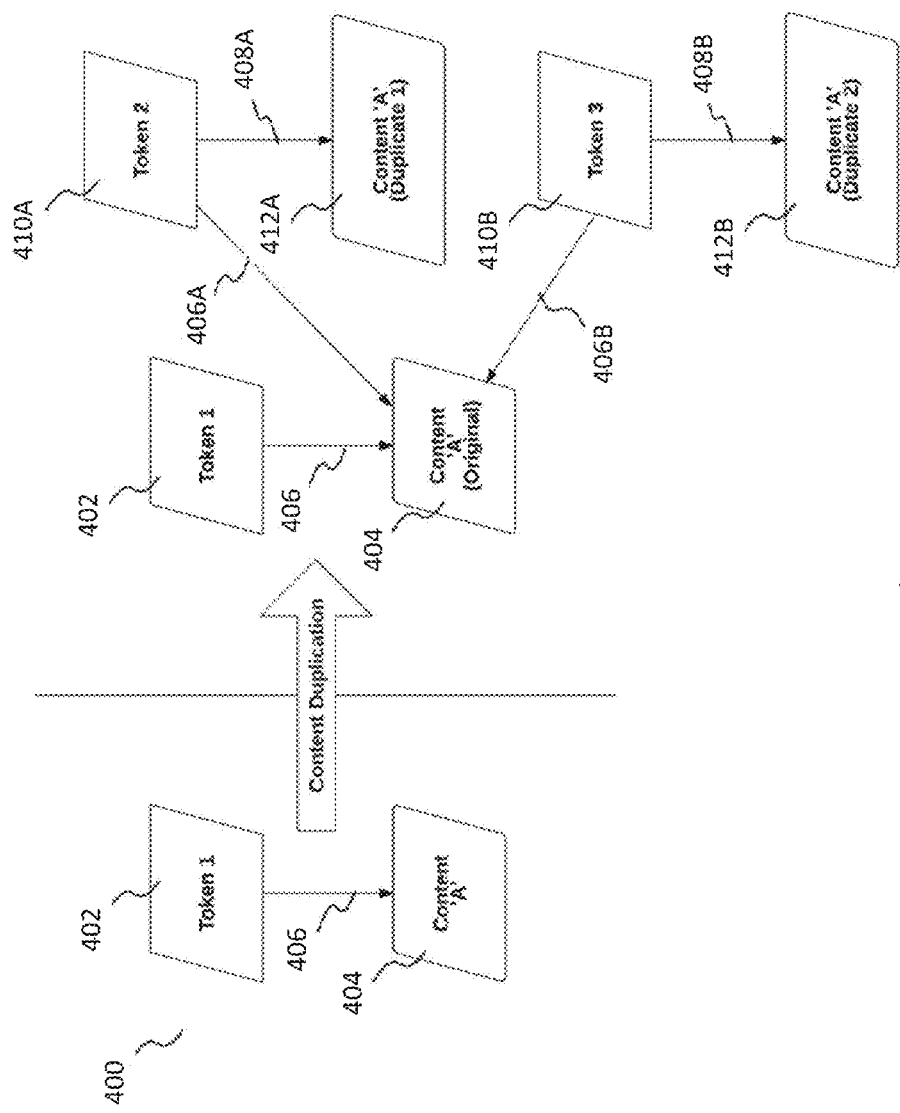
FIG. 4 illustrates an example token duplication process performed by the token exchange system.

FIG. 4 illustrates an example token duplication process 400 performed by the token exchange system 200. In the example embodiment, a token 402, labeled "Token 1," includes initial token content ("Content A") 404. The link between the token 402 and Content A 404 is shown symbolically with an arrow 406 for purposes of illustration. However, it should be understood that the content 404 is part of the token 402. In some embodiments, the token duplication process 400 may be provided, in whole or in part, by the token exchange server module 250, and the token 402 may be similar to the token 312 provided by the server 260.

In the example embodiment, Token 1 402 is duplicated into two additional tokens: a second token ("Token 2") 410A, and a third token ("Token 3") 410B. During the duplication process, Content A 404 is copied twice. More specifically, Token 2 410A receives a duplicate of Content A 404, identified as duplicate 1 content 412A, and Token 3 410B receives a duplicate of Content A 404, identified as duplicate 2 content 412B, leaving the original token 1 402 with the original content A 404. Since Token 2 410A is derived from the original token, Token 1 402, Token 2 410A includes a link 406A to the original token 1 402 and, thus, to the original content A 404, as well as a link 408A to the duplicate 1 content 412A. Similarly, since Token 3 410B is derived from the original token 402, Token 3 410B includes a link 406B to the original token 1 402 and, thus, to the original content a 404, as well as a link 408B to the duplicate 2 content 412B.

In some embodiments, token content is stored permanently on the server 250 (e.g., within the databases 320, 322). For example, once a session with the user device 220 is closed, any token content stored locally on the user device 220 is removed from the device by an upload process between the token exchange client module 210 and the token exchange server module 250. In other words, local token content is deleted from the user device 220 and may be uploaded to the server device 260 or to the database 270 (e.g., for persistent storage). In some embodiments, some token content may be kept locally on the user device 220 and may be encrypted for security. Such security helps ensure that only an authorized user accesses the content during a session. In some embodiments, the upload process can be initiated by a process within the token exchange server module 250.

In the example embodiment, tokens such as the tokens 402, 410A, 410B can become associated with the user 100 (e.g., assigned to the user 100 via a user profile). This association is sometimes described herein as "ownership" since, for example, the associated user (or "owning user") has certain privileges that allow the owning user to perform operations relative to the token such as, for example, viewing the token content linked to the token, exchanging the token with other users, duplicating the token, or applying certain transformation functions to the token. In some embodiments, a token can be assigned to many users ("shared tokens," e.g., shared via their user profiles).

In some embodiments, some tokens may not be associated with any particular user 100. For example, if a token is not associated with any user 100, it is said to be "floating" or "unowned," and may be acquirable (e.g., picked up or claimed) by users 100 (e.g., via the token exchange client module 210). Floating tokens may be subject to the same processes (e.g., transformations) as non-floating tokens. In some embodiments, a floating token may reside on a cloud based database (e.g., the database 270) and may be accessed via the server 260. The floating tokens can be associated with the user 100 through a process that involves client/server communication and data transfer (e.g., between the token exchange client module 210 and the token exchange server module 250). For example, presume the user 100 wishes to take possession of a floating token (e.g., Token 1 402). During an ownership acquisition process, the token exchange client module 210 within the user device 220 contacts the token exchange server module 250 to request acquisition of the floating token. The token exchange server module 250 identifies Token 1 402 in the database 270, determines that it is floating (e.g., not owned by any other user), and associates the floating token with the user 100 (e.g., with the profile of the user 100 that made the request), thereby allowing the user 100 to acquire Token 1 402.

In some embodiments, some tokens 312 may reside on particular user devices 220 of various users 100. For example, the floating token (e.g., Token 1 402) may reside on the user device 220 of the user 100 (e.g., the token 402 and associated Content A 404 is stored locally on the user device 220). Subsequently, a second user (not separately shown) on a second user device may attempt to acquire the token 402 from the first user device 220 (e.g., by making an acquisition request). For example, the token exchange client module 210 of the user device 220 may communicate with the token exchange client module 210 within the second user device to perform the acquisition, which may involve transfer of the token and token content to the second user device, or up to the server 260 or database 270. In some embodiments, the acquisition request between the two user devices 220 may be brokered by the server 260, where in other embodiments, the two user devices 220 may broker the acquisition request between themselves (e.g., with the owning user device 220 acting as the controller of the token 402).

In the example embodiment, tokens may have one or more attributes. Attributes may represent, for example, a characteristic, quality, or property of the token. An attribute can be used in various ways. For example, an attribute can be used by (e.g., read, modified by) a transform function, or an attribute can be used to determine matches between users, or the attribute can be used to match a user to a token.

One example token attribute is "Creation Time." In the example embodiment, Creation Time is a time when the token was created. A token is created by a process which can be initiated by token exchange client module 210 (e.g. by a user) on a user device 220 or by a token exchange server module 250. The creation process instantiates the properties of the token, for example associating the token with token content, with a user, with a location, and may register it on the server device 260 or the database 270.

Another example token attribute is "End Time." In the example embodiment, End Time is a specified time when a token is set to expire. A token can be deleted (e.g., by the token exchange client module 210 or the token exchange server module 250) when it reaches its End Time, or it may be put in a suspended state or ghost state where it cannot be accessed by users.

Another example token attribute is "Current Location." In the example embodiment, Current Location represents the current geospatial location of a token (e.g., within a virtual environment, within the real world, or within a virtual representation of the real world). Current Location is a variable representing the location of the token at a specific time. Current Location may include, for example, one or more of the following: latitude and longitude coordinates; an address (e.g., street number or street intersection); cell tower trilateration; Wi-Fi network trilateration; and GPS coordinates. Current Location may refer to a location area around a set of coordinates or an address. For example, the location area could be a circle defined by a center point and a radius from the coordinates or the address. The location area could also be defined by a pre-defined shape surrounding a point (e.g., a square, a triangle), or a context-dependent shape (e.g., a number of city blocks radius or number of streets radius). If the token is associated with the user device 220 (e.g., because it is owned by the user 100), then the token may inherit the current physical location of the user device 220. If the token is not associated with the user device 220, then the token may still have a value for the Current Location, but the Current Location may not be linked to any specific user device 220.

In some embodiments, the user 100 may dissociate a token from the user device 220 (e.g., "leaving" or "disowning" the token at a particular real world location). In such a process, the token may inherit the real world location of the user device 220 at that time, and the token content for the token would reside on a server 260 and database 270. In such a situation, the token may be owned by the user or may become a floating token if the user releases their ownership.

In the example embodiment, the user 100 also has an associated token (not separately shown) associated with that user 100 (or with their user device 220). As such, the user 100 also has a current location, which may be similar to the token attribute. In some embodiments, the current location for the user 100 is determined by the location of the user device 220 on which the user 100 is logged in (e.g., via GPS location or other geolocation technology). The current location of the user 100 and the current location of a token can be used to match the user to the token.

Figure 5:
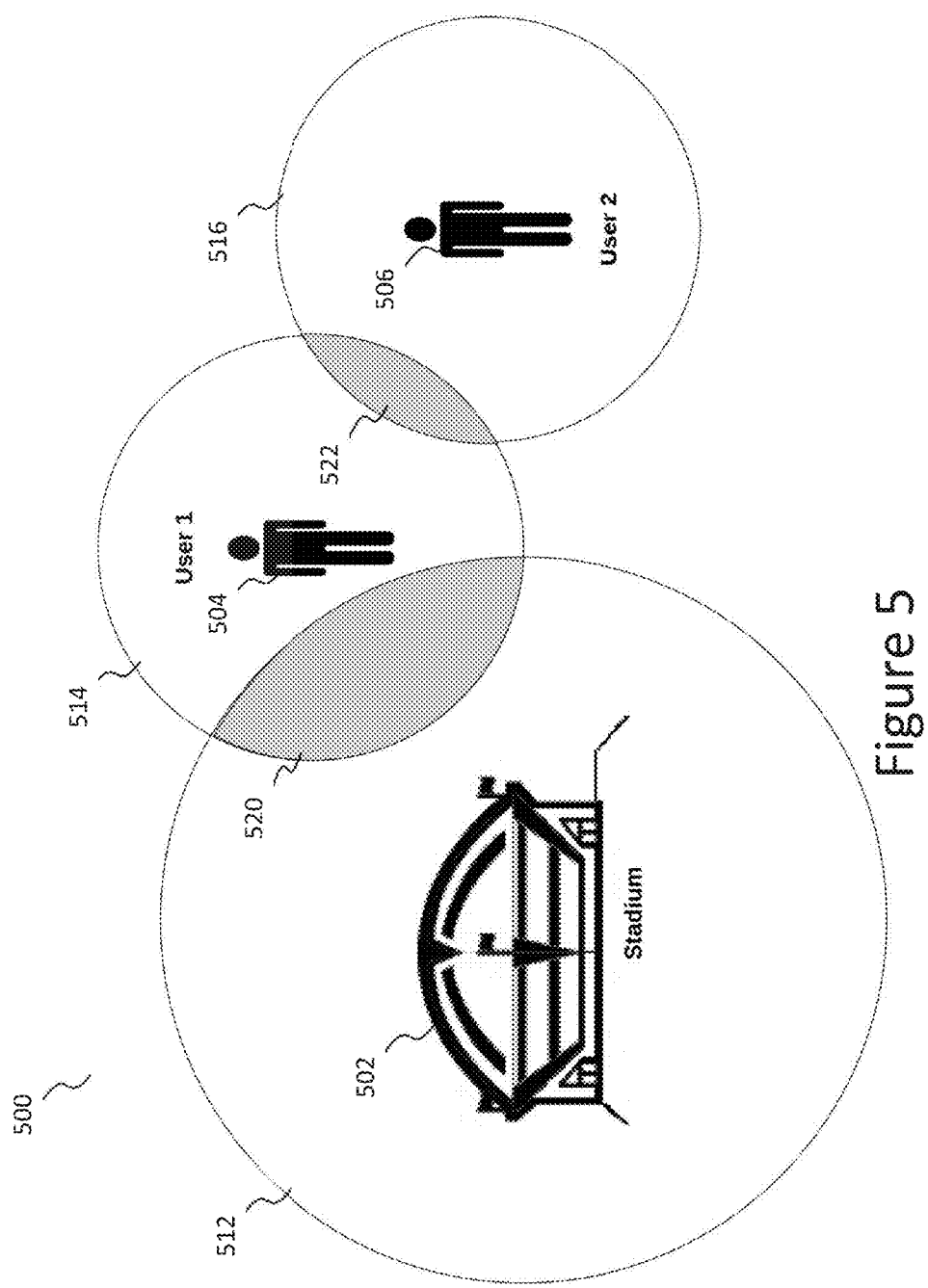
FIG. 5 illustrates an example of Current Location for a token associated with a stadium, and the current location of two users, User 1 and User 2 in an environment.

FIG. 5 illustrates an example of Current Location for a token associated with a stadium 502, and the current location of two users, User 1 504 and User 2 506 in an environment 500. In the example embodiment shown in FIG. 5, the environment 500 includes both real-world elements (e.g., the actual stadium 502, and the persons of User 1 504 and User 2 506, in relative proximity as determined by their current locations), as well as virtual elements (e.g., digital objects associated with the stadium 502, or avatars representing User 1 and User 2). The environment 500 may be referred to, in some cases, as the real world, and because the token exchange system 200 may also maintain or access virtual elements representative of real-world elements (e.g., places, buildings, devices, people, and so forth), the environment 500 may be referred to, in some cases, as a virtual environment. The users 504, 506 may be similar to the user 100, operating mobile devices such as the HMD 102 or the user device 220.

In the example embodiment, User 1 504 is in proximity to the stadium 502. The stadium 502 has an associated token (not separately depicted in FIG. 5, but represented as the stadium 502). A stadium area 512 is outlined in FIG. 5, defined by a radial distance from the center of the stadium 502, or from a location pre-determined as representing the stadium 502 (e.g., the Current Location of a token associated with the stadium 502). A User 1 area 514 and a User 2 area 516 are also outlined in FIG. 5, defined by a radial distance from the current location of User 1 504 (e.g., the location of a mobile computing device associated with User 1) and a radial distance from the current location of User 2 506 (e.g., the location of a mobile computing device associated with User 2), respectively. In the example embodiment, users such as User 1 504 and User 2 506 may each have an associated token.

FIG. 5 also depicts two intersection areas 520, 522. Intersection area 520 represents an overlapping region defined by the intersection of the stadium area 512 and the User 1 area 514. Intersection area 522 represents an overlapping region defined by the intersection of the User 1 area 514 and the User 2 area 516. In the example embodiment, actions (e.g., transforms, token exchanges) that involve overlapping areas can be initiated by either device or digital object (e.g., for intersection area 520, the User 1 504 and/or the stadium token, or for intersection area 522, or for intersection area 522, the User 1 504 and/or the User 2 506). For example, the interaction area 522 may allow User 1 504 and User 2 506 to be able to view and interact with each other's tokens, and the interaction area 520 may allow User 1 504 to acquire the token of the stadium 502. In other words, User 2 506 may be able to see the stadium 502 token if User 1 504 takes possession of it.

Another example token attribute is "Content Location for Digital Content" ("CLDC"). In the example embodiment, CLDC is a static value identifying the location where token content is first created. CLDC can be expressed as, for example, one or more of latitude and longitude coordinates, an address or street intersection, and GPS coordinates. For example, if token content is a picture of the Eiffel Tower taken by a user's mobile device, then the CLDC may include the Eiffel Tower's GPS coordinates, or the Tower's address, and can include additional information such as the country. In some embodiments, the CLDC remains fixed until the token content is overridden by new content.

Another example token attribute is "Content Location for Physical Objects" ("CLPO"). In the example embodiment, CLPO is a value of the current location of a physical object for which a token is linked. CLPO can be expressed as, for example, one or more of latitude and longitude coordinates, an address or street intersection, and GPS coordinates. In some cases, the CLPO may be static, where in other cases, the CLPO may be dynamic. For example, the physical object with which the CLPO is associated can be a fixed object such as a building, statue, or landmark location (e.g., a field) that does not necessarily move, or may be a moveable object who's position may be identified (e.g., via a location tracking device which provides the dynamic value of the current location).

Another example token attribute is "Locations List." In the example embodiment, Locations List is a list including past token locations, and may include a timestamp for each location in the list. The list may also include the current location. The Locations List can have any level of detail with respect to the time at which each location in the list is recorded (e.g., precise time, hour and date, date). Location may be recorded at a fixed time interval (e.g., every 1 minute, or every 10 minutes) or location may be recorded only when the location changes significantly (e.g., movements of more than 10 meters or more than 50 meters). In some embodiments, the Location List creates a path that records the movement of a token over time.

Another example token attribute is "Atoms List." In the example embodiment, Atoms List is a list of dynamic attributes and associated values. For example, a grocery coupon token may have an Atom List of items and the amount spent on groceries every time the token is used. The Atom List may, for example, also have a historical listing of items and amount spent from previous trips to the store.

Another example token attribute is "History of Attributes." In the example embodiment, Histor of Attributes includes a record of current and/or past attribute values over time.

Another example token attribute is "Name/Title." In the example embodiment, Name/Title is a label for human use that helps users identify a token.

Another example token attribute is "Description." In the example embodiment, Description includes text (e.g., input from a user device) that describes the token in some way. Description can be matched with other tokens (e.g., via their attributes) or matched with other users (e.g., via their user profile). A server process may use the Description to match tokens together and signal users linked to those tokens if a match is made. A server process can use the Description to match a user directly to one or more tokens and signal the user of the match. The process of matching tokens and users is described below.

Another example token attribute is "Kind or Type" ("KoT"). KoT is used to categorize a token. KoT may be used, for example, when sorting tokens or searching for tokens or for matching tokens.

In the example embodiment, a token can have one or more connections to one or more other tokens ("token connections"). A token connection can be an inbound connection (e.g., from another token) or an outbound connection (e.g., to another token). An inbound connection to a token is a connection whereby a token receives information and data from another token. A token can have any number of inbound connections. An outbound connection from a token is a connection whereby a token sends information and data to one or more other tokens. For example, a first token may have an outbound connection to a second token that causes the second token to receive data from the first token when that first token changes state. As such, the second token may change in some way based on the change in the first token. The connections between tokens can be used, for example, to create various topologies including directed acyclic graphs (DAG), linear, chaotic regions, binary trees, and the like.

In some embodiments, a token connection can form a link directly between one or more attributes of one token to the same one or more attributes of another token. The connection between an attribute of a first token and an attribute of a second token can include the linking of the values of the attributes whereby modifying the attribute value in the first token causes the linked attribute value in the second token to change accordingly (e.g., via reference, or via alteration). For example consider two tokens, "Token A" and "Token B." Presume that one attribute of Token A has an outbound connection to the inbound connection for the same attribute for Token B such that if the attribute value for Token A is modified, then the linked attribute value for Token B is automatically changed (e.g., copied to match the attribute value of Token A). For example, both Token A and Token B may include a connected attribute of "End Time", a time at which some process is to conclude. As such, Token A and Token B may share the same End Time due to the connection of the Ent Time attribute between the two tokens. In some embodiments, tokens can be co-connected such that a change could originate from either end (mutual connections, e.g., from Token A or from Token B). In some embodiments, the tokens can be connected with a parent/child relationship such that parent attributes can modify child attributes, but child attributes cannot modify parent attributes (e.g., cascading connections). Both parent attributes and child attributes can be modified directly by the user device 220.

In the example embodiment, the token exchange system 200 provides for Token Groups to be defined and used. A Token Group is a set of one or more tokens that have a defined set of properties that include at least one of the following: the token being within a geospatial area; the token having one or more specific attributes or states (such as having a state set to virtual); and the token having connections to other tokens. The connections to other tokens include links to tokens that are outside the one or more geospatial areas. A Token Group allows a user to define a group wherein all tokens with a specific set of attribute properties (or states) within a specified geospatial area can be associated (e.g., selected). The connections allow the expansion of the Token Group to include tokens from outside the geospatial area. A query language can be used to define the Token Group. A Token Group can also include connections between tokens. In some embodiments, the Token Group may be defined during operation (e.g., by one or more users, or automatically by the token exchange client module 210 or the token exchange server module 250).

In the example embodiment, the token exchange system 200 provides transform functions. A transform function is an operator that acts on one or more elements of a token to modify the elements. Elements may include, for example, the token attributes, states, properties, and other token content. A transform function can cause one or more token elements to change once, or over time. For example, an image associated with a token may be configured to slowly degrade over time (e.g., blurring or deteriorating over the course of a week), or an object may be configured to slowly fade away over the course of a few hours. A transform function can cause a token element to evolve (e.g., change) over time. Accordingly a transform function can affect the behavior of a specific token at specific point in time (and over time). The changes brought about by a transform function can influence the way in which a particular token may be shared, grabbed, exchanged, or otherwise interacted with by other tokens and user devices 220.

In some embodiments, a transform function resides on a server (e.g., within the token exchange server module 250) and is called locally on that server, or remotely from another server, or from a user device (e.g., from within the token exchange client module 210). In other embodiments, transform functions reside on a user device 220 (e.g., within the token exchange client module 210) and may be executed locally on the user device 220, either by the user device 220 or prompted by a remote device such as another user device or the server.

Some transform functions can be used to implement behaviors such as, for example, token content degradation, location based identity matching, and games (e.g., including challenges based on token grabbing mechanisms). Some transform functions can take an attribute value as an input and modify the value according to a mathematical formula or a set of rules and then output a modified value of the attribute and replace the attribute value for the token. Some transform functions can act on a single attribute, or it can act on multiple attributes at the same time. Some transform functions can act on multiple tokens at the same time (e.g., via token connections). For example, if a transform is acting on an attribute of a first token, and that attribute has a connection to an attribute on a second token, then the transform may act on the attribute of the second token as well. Some transform functions erase the location history attribute of a token. This could be useful, for example, when a token is exchanged between users and the location history linked to the first owner is erased.

Some transform functions provide content degradation. A content degradation transform is a function that applies a negative or positive filter directly on token content to, for example, create a positive progression (e.g., an enhancement) or a negative progression (e.g., a degradation). The filter can act at one single moment or the filter can act over time. The filter can use a formula or a set of rules to modify content. The filter can use content filtering and modification methods (e.g., image enhancement and degradation, video enhancement and degradation). The degradation function can be created and modified by a user (e.g., via computer code) or could be chosen from a set of predefined degradation functions that can be applied to a given content type (e.g., audio, video, 3D virtual object). The degradation function could be created when the object is created or any time thereafter.

For example, consider a situation wherein the user 100 wears the HMD headset 102 for AR, and the user is presented with a virtual 3D object via the HMD 102. The degradation function may be triggered by the user 100 touching the object, or by grabbing and taking possession of the object. The degradation function could cause the object to visually degrade making the object look older. The degradation function can either improve or degrade token content. As an example of token improvement, consider a token with a digital image as token content. The degradation function could act on the digital image and degrade the image over time. As an example of positive progression, the degradation function could act on the digital image and enhance the image over time.

In some embodiments, a connection can include a link directly between one or more transforms of two or more tokens. For example consider two tokens, "Token C" and "Token D." A transform of Token C may have an outbound connection to the same transform for Token D such that if the transform for Token C is triggered (e.g., by a user via a user device 220), then the linked transform for Token D will be automatically triggered as well. For example, Token C may include a degradation transform that causes Token C to change over time. Token C may include an outbound connection for that transform to Token D, causing Token D to be subject to the same degradation transform as Token C.

Some transform functions change a state of tokens. A state change transform is a function that transforms the state of a token (e.g., from a first state to a second state). In the example embodiment, tokens such as the tokens 402, 410A, 410B can have one or more states. Token states represent some condition of the token or elements of the token at a particular time. Such elements may include, for example, the attributes, unique identifier, token owner and token content. The following are some examples of token states. This is not a complete list. The names of the states can vary from those below without departing from the scope of the disclosure herein.

In some embodiments, a Broadcasting State is provided. The Broadcasting State is a state identifying whether or not a token is broadcasting. Broadcasting is described in greater detail below. In some embodiments, an Owned State is provided. The Owned State identifies whether or not a token is owned (e.g., by a user). In some embodiments, a Deprecated State is provided. The Deprecated State identifies whether a token has undergone, or is undergoing, depreciation with respect to the token content (e.g., the depreciation may occur from a content degradation transform). In some embodiments, an Available State is provided. The Available State identifies whether a token that is owned by a user is available to other users for exchange, sharing, swapping, sale or the like.

In some embodiments, a Floating State is provided. The Floating State identifies when a token is not owned by any user and is available to any user via a user device. In some embodiments, a Deleted State is provided. The Deleted State identifies whether a token is deleted. Deleted tokens may remain on a server, but may be marked as deleted via the Deleted State. In some embodiments, an Idle State is provided. The Idle State identifies whether a token is not engaged in any activity such as, for example, sending and receiving data, or being acted on by a transform function.

In some embodiments, an Existence State is provided. The Existence State may include Past, Real, Future, Virtual, and Ghost states. The Existence State may be used to control how tokens interact with, or are perceived by, end users or other tokens. Past state: A past state is one where a token had real attribute values in the past, but is currently in a ghost state. Real state: The real state is a state whereby the attributes of a token are single valued so that each attribute has a single value at any time. Future state: A future state is one where a token does not yet have real attribute values but will have real values at a defined future time. A user can see the token but do nothing with it until the values become real at the defined future time. The token is in a ghost state until it changes into a real state at the defined future time. Virtual state: A virtual state is one wherein a token has one or more attributes that have multiple values at the same time (e.g., having three simultaneous location attribute values).

In some embodiments, when a user performs one or more defined actions, the multi-valued virtual attributes may collapse into one real single valued attribute. In some embodiments, the virtual state may collapse into a real state based on the actions performed by a user. The change of state is controlled by the state change transform. The action of converting the token from a virtual state to a real state is performed by a transform function. In some embodiments, the action of accessing one single attribute of a token in a virtual state will collapse all other attributes of that token into real single values. For example if a token has 5 virtual attributes and a user accesses one of the 5 attributes then all 5 virtual attributes collapse to 5 real attributes.

In some embodiments, there is a unique token for each unique combination of virtual attributes. For example if a token in a virtual state has three location values and two name values then there will be six virtual representations for the token because there are two virtual tokens (e.g., with the two names) at each of the three locations. Since all of the virtual tokens exist, a user may see two of the virtual token representations at each of the three locations. Imagine there are three users (e.g., playing a video game in multiplayer mode), each with an AR HMD 102, with one user at each of the three locations. Furthermore, consider that each user sees (via their HMD) two of the virtual tokens in AR. If one of the users accesses any one of the six virtual token representations then all six collapse into one real token, wherein the one real token has the values associated with the token that the user accessed. In other words, after the collapse, there is only one real token with one name at one location (e.g., the one the user accessed). The five virtual tokens that were not accessed cease to exist. This can be achieved, for example, by deleting all of the other 5 virtual tokens from all servers.

Ghost state: A ghost state is a state wherein a token is "perceived" by other tokens and users but the token disappears as an interaction is performed on it. For example, a ghost state would allow a token to be seen in a list as existing on a server, but any attempt to interact with the token (e.g., beyond viewing it in a list or viewing its attribute values) causes that token to, for example, disappear, or be deleted from the list. The state change transform controls the state change from a ghost state to a deleted state. This functionality could be used for user challenges or games. For example, the user 100 may be engaged in an MR environment and viewing a virtual object that includes a ghost state. The user 100 would see the virtual object but the virtual object may disappear when the user 100 interacts with it.

In some embodiments, some states may have one or more transform functions associated with it. A transform function can change the state of a token. The transform function may require a series of actions to be completed in order to change the state of the token to a specific state. For example, a token may be associated with a physical object that needs to be purchased by a user before the token can be in a state where it can be exchanged by that user. For another example, a token may be grabbed by a user but may require actions, such as viewing advertising, before being in a state where it can be used by that user.

In some embodiments, the user 100 can view (e.g., via a user profile on the user device 220) all the information (e.g., the attributes, states, token content) of a token that they own, or that is floating. A user can retrieve the token and all its information by requesting it. The request initiates a server process that, in turn, accesses one or more databases where the token (and its information) is stored. Requested content is fetched from the server 260 and rendered onto the user device 220 where the request was initially triggered.

In the example embodiment, tokens may be matched to one or more users (a "token-to-user" match, e.g., via the user profile information), and tokens can be matched to one or more other tokens (a "token-to-token" match). A token-to-user match can be determined by matching some attributes of a token with the attributes or preferences of one or more user profiles. Similarly a user can be matched to one or more tokens. Matches can be made based on any aspect of a token's attributes, states, or token content and any aspect of a user's attributes and profile. A token-to-token match can be determined by matching some attributes of a token with the same attributes of other tokens (e.g., area, description, and so forth).

For example, a token can be matched to a user based on the location attribute for both the token and the user (e.g., whereby a match occurs if the token and the user have the same location attribute, or are in close proximity to each other). Locations can be matched by using longitude and latitude coordinates (or GPS coordinates or any other means of defining location, including a match radius extending out from the center of the defined location). The coordinates and the match radius define a location area (or just location) for a token and for a user. If the location of a token and a user overlap, such as illustrated by the intersection area 520, then the two entities can be matched since they can be said to be at the same location or in close proximity to each other. The location area around a token (e.g., stadium area 512) can allow for a plurality of tokens and users to be defined as being within the possible "grab" range of the user 504. For example, if two users 504, 506 overlap with their locations, then they can see each other's tokens and start interacting to exchange tokens. The match radius may also be used to identify free floating tokens around a user. This matching can be implemented using a database function such as the geospatial support within the commercial MongoDB database.

In some embodiments, a token can be modified by the act of being matched. In other words, a token may be configured to "react" to being matched. The specifics of the modification may be configured to depend on the attributes of the token or the other entity (e.g., user profile or token) with which that the token is matched. If two tokens are matched, they may be able to communicate with each other and transfer information. The information transfer may modify the state of each of the matched tokens, and it may also modify the attributes of each of the matched tokens.

In some embodiments, the token exchange system 200 provides for Events. An Event includes a set of one or more Event Conditions, as well as one or more Event Effects. The Event Conditions identify conditions that, when they occur (e.g., within the environment 500), cause the execution of the Event Effects. For example, each instance of swapping, exchanging, and matching of tokens and users may be an Event. An Event may be triggered, for example, by the user 504 being at a location (e.g., the stadium 502) within a specific time period, or may be triggered by the user independent of the user device location. An Event can include the matching of two or more entities. For example, an Event can be the matching of one or more users to one or more tokens, or the matching of one or more users to one or more users, or the matching of one or more tokens to one or more tokens. An Event can also include the swapping or exchanging of tokens between two or more users. An Event can also include a real world event (e.g. an event given by a real world commercial entity) where users can participate in the Event if they own a token from the Event. For example, an Event may include a token party where users gather and perform token related actions.

In one embodiment, an Event timer may be started as a user enters a location (e.g., a token or user location, such as the stadium area 512) and stops when the user exits the location. The Event timer may trigger various Events and actions (e.g. transform functions) during its duration. The triggering of Events can be linked to the progression of the timer.

In the example embodiment, the token exchange system 200 provides for token exchange. A token exchange is an Event wherein one or more tokens can be exchanged between two users (e.g., via user devices). A token is said to "move" or "transfer" from one user to another user as the result of an exchange between the two users (e.g., the data for the token may be transmitted from a first user device to a second user device, or from a user device to a server, or from a server to a user device, or from a server to a server). Further, the token ownership changes as a part of the token exchange. For example, presume User 1 504 owns a token labeled "Token M," and User 2 506 owns a token labeled "Token N." If User 1 504 and User 2 506 wish to exchange Token M and Token N, such an exchange would cause Token M to be assigned to User 2 506 and Token N to be assigned to User 1 504. An exchange can include one token for one token, one token for many tokens, many tokens for many tokens, or one or more tokens for nothing (without reciprocation, e.g., "for free"). In some embodiments, exchange criteria must be satisfied before an exchange can happen. The criteria can be based on, for example, token attributes, user attributes, and user preferences. The criteria can include a set of rules. For example, exchange criteria may include two users exchanging tokens only if the locations of both users overlap such that they are within a physical distance from each other.

In some embodiments, token trading is an Event similar to token exchange, except that token trading relies upon tokens having a value such that one or more tokens may be traded for one or more other tokens depending on value. The total value of tokens coming from the one or more users on one side of the trade, in some embodiments, must be equal to or within a pre-determined amount of the total value of the tokens involved in the swap. For example, two tokens from User 1 504 may be traded for one token from User 2 506 if the two tokens from User 1 504 have an approximate value to the one token from User 2 506. The value of a token can be defined by, for example, a system of points, or monetary value, or by some content-specific or environment-specific metric associated with the token. In some embodiments, users (e.g., via a user device) can approve a trade even if the tokens being traded are not equivalent in value. The users involved in the trade can decide on a value gap that is acceptable when engaging in a token trade. In some embodiments, if a token does not have a value, only the exchange of tokens is possible.

Figure 6:
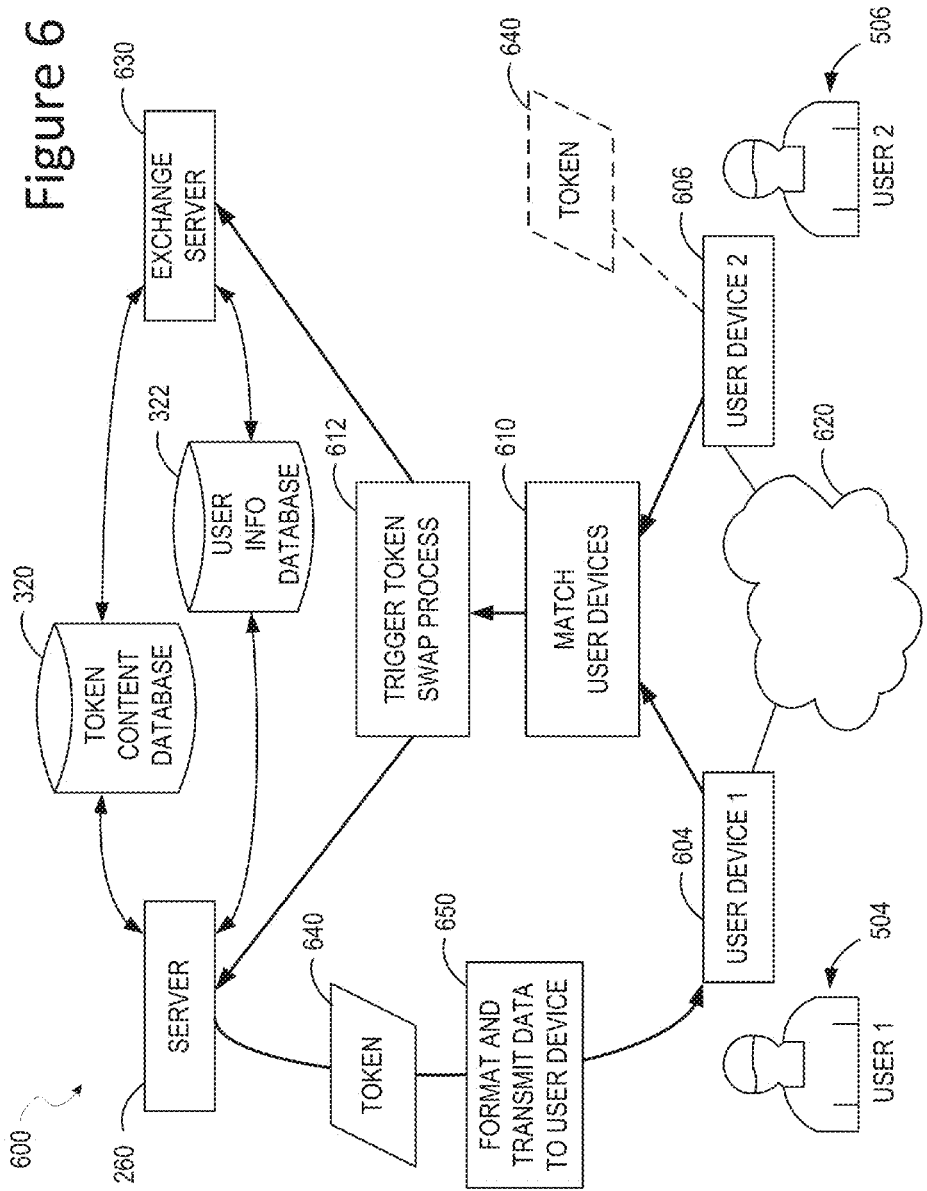
FIG. 6 is a data flow diagram illustrating an example token swap between User 1 and User 2.

FIG. 6 is a data flow diagram 600 illustrating an example token transfer between User 1 504 and User 2 506. In the example embodiment, User 1 504 operates a device 604, User 2 506 operates a device 606, each of which may be similar to the HMD 102 or the user device 220. Further, User 2 506 initially owns a token 640 that is to be transferred to User 1 504, the initial ownership of which is illustrated by the broken line attachment of the token 640 to the user device 2 606. At the time of the example token transaction, User 1 504 and User 2 506 are in close physical proximity, such as illustrated in FIG. 5. For example, User 1 504 and User 2 506 may be within a prescribed geolocation 620, or within a pre-determined distance of each other (e.g., within 100 feet). User 1 504 operates a Device A 604 and User 2 506 operates a Device B 606. Device A 604 and Device B 606 may be similar to the user device 220. The locations for the two users overlap, and their respective user devices 604, 606 are matched together via a user matching event (see operation 610). The two devices may communicate directly with each other via a wireless technology (e.g., Wi-Fi, Bluetooth, cellular network, the Internet) or they can communicate with each other via one or more servers (e.g., server 260 or an exchange server 630).

In the example embodiment, if the two users consent to a token transfer, then a token transfer process (e.g., exchange event, trade event) is initiated through one or more servers 630, 260 (see operation 612). A token transfer is a communication and data exchange between by an exchange server 630 and the server 260 to exchange data from a first user device 606 to a second user device 608. The token data can also be on a database 270A, 270B. Some token transfers may be trades (e.g., where one party is exchanging one or more tokens, and optionally other consideration, for consideration from another party). Other token transfers may be gifts (e.g., where one party is transferring one or more tokens to another party without reciprocation).

In the example embodiment, the token transfer process includes receiving identification of the token 640 that is to be subject of the transfer, receiving consent from the user to relinquish the subject token to a user (e.g., consent from User 2 506 to relinquish the token 640 to User 1 504), updating the token content database 320 to reflect ownership of the token 640 to User 1 504, and formatting and transmitting the token 640 to the user device 1 604 (see operation 650).

In some embodiments, the token exchange system 200 provides for broadcasting Events. Broadcasting is an Event that includes the distributing of notifications from one token or user device 604, 606 to other tokens or other user devices 604, 606. The notification can include information that a token or a group of tokens are available to be accessed (e.g., available to be taken by a user). The broadcasting of tokens can be done via any network technology including wireless technology such as WiFi, Bluetooth, 3G or the like. Broadcasting of notifications (e.g., for particular tokens) may be requested by a user.

In the example embodiment, the action of broadcasting is performed by a server process (e.g., from within the token exchange server module 250), or from a user device (e.g., from within the token exchange client module 210). In some embodiments, a user that receives (e.g., via a process from within the token exchange client module 210) a broadcast regarding a token may access a server to gain access to the token. The access is regulated via a secure login process between the user device 220 (e.g., the token exchange client module 210) and the server 260 (e.g., the token exchange server module 250). In some embodiments, the access to the token is temporary. In some embodiments, a user that receives (e.g., via a process from within the token exchange client module 210) a broadcast regarding a token accesses a second user device 220 to gain access to the token. The access is regulated via a secure login process between the first user device and the second user device.

In the example embodiment, the token exchange system 200 provides for token grabbing. Token grabbing is an event that involves a user taking ownership of a token. Once a token is grabbed by a user, it is removed from the pool of available tokens (e.g., floating tokens, tokens that have been set to available by a user). A grabbed token can become available if the user changes the token status. For example, when a user initiates a token grab action, the token exchange system 200 may determine that the token is unowned and available to be grabbed. If the token is unowned, the token may then be locked by the token exchange system 200, which may then update the ownership of the token to that of the grabbing user (e.g., updating the token attribute "TokenOwnerID" to a unique identifier of the grabbing user). Such attribute data may be tracked in the token content database 320 or the user info database 322.

In the example embodiment, the token exchange system 200 provides for token forfeiting. A token can be forfeited by a user. A forfeited token is given back to the pool of floating tokens. For example, upon forfeit of a token by a user, the token exchange system 200 may remove the ID of the user from the TokenOwnerID of the token in the token content database 320, or enter a pre-determined ID associated with unowned tokens, thereby making the token unowned.

In the example embodiment, the token exchange system provides for token gifting. A token can be given ("gifted") from one user to another user (e.g., without compensation). Such an event is similar to a token exchange except that one user provides no token or other consideration for the exchange.

In one example embodiment, the token exchange system 200 may be used within a sport card exchange application whereby each individually identifiable sport card, real or virtual, is uniquely identified with a token. For example, the user 100 may buy a pack of physical trading cards from a local merchant, or a pack of digital cards from an online virtual card provider. The user 100 may then broadcast the tokens for the cards in order to trade them with other users. Similarly, a first user could broadcast their intent to find specific cards (e.g., tokens) that match specific criteria. For example the first user might broadcast their intent to find all cards representing outfielders for the New York Yankees. A matching function would match the tokens in the broadcast with the tokens of other users. A user with one or more of the tokens in the broadcast could then swap or exchange cards with the first user. At the same time, the two users would also exchange the tokens for the exchanged cards.

Figure 7:
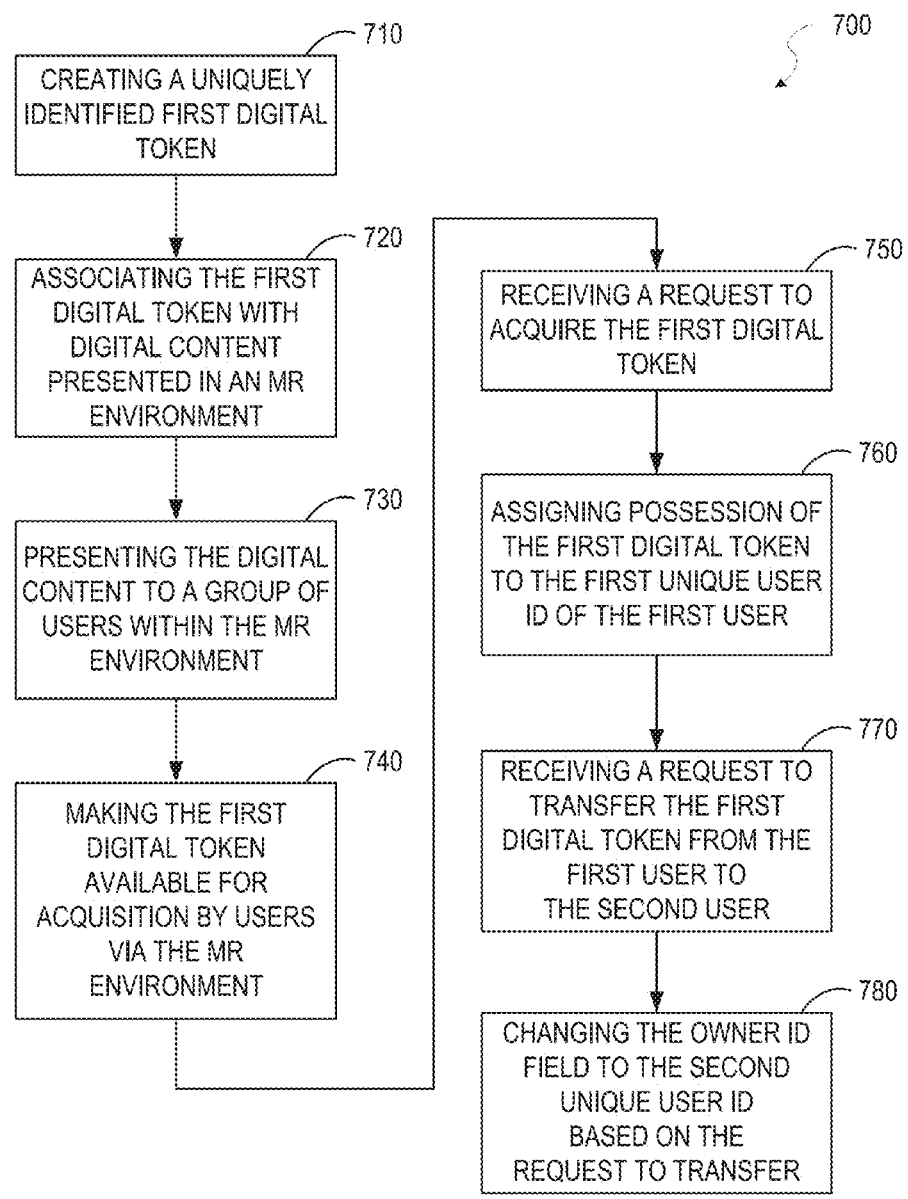
FIG. 7 is a flowchart of an example computer-implemented method for providing the digital tokens described herein.

FIG. 7 is a flowchart of an example computer-implemented method 700 for providing the digital tokens described herein. The computer-implemented method 700 (hereafter referred to as "the method 700") is performed by a computing device including at least one hardware processor and a memory. In the example embodiment, the method 700 includes creating a uniquely identified first digital token, the first digital token being configured to be solely possessed by a single user, the first digital token including an owner ID field identifying the current possessor of the digital token (see operation 710). The method 700 also includes associating the first digital token with digital content, the digital content includes content presented to the first user in a mixed reality (MR) environment, the MR environment being additionally experienced by a group of users including a second user (see operation 720).

In the example embodiment, the method 700 further includes presenting the digital content associated with the first digital token to the group of users within the MR environment (see operation 730). The method 700 also includes making the first digital token available for acquisition by users of the group of users via the MR environment (see operation 740). The method 700 further includes receiving, from the mobile computing device of a first user, a request to acquire the first digital token, the first user having a first unique user identifier (ID) (see operation 750).

In the example embodiment, the method 700 also includes assigning possession of the first digital token, via the owner ID field, to the first unique user ID of the first user based on the request to acquire the first digital token (see operation 760). The method 700 further includes receiving a request to transfer the first digital token from the first user to the second user, the second user having a second unique user ID (see operation 770). The method 700 also includes changing the owner ID field to the second unique user ID based on the request to transfer (see operation 780).

In some embodiments, the method 700 further includes receiving, from a third user, a request to broadcast availability of a second digital token for acquisition by users of the group of users, and presenting, via the MR environment, availability of the second digital token for acquisition. In some embodiments, the first digital token includes one or more of an inbound connection and an outbound connection to one or more other digital tokens. In some embodiments, the first digital token includes a transform function configured to modify the first digital token upon occurrence of an event.

In some embodiments, the method 700 further includes creating a second digital token associated with the first digital token, the digital content of the second digital token including a link to the digital content of the first digital token. In some embodiments, creating the second digital token is initiated based on receiving a request to duplicate the first digital token. In some embodiments, the first digital token is grouped with other digital tokens based at least in part on one or more of geospatial area, token attributes, and links between tokens.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 8:
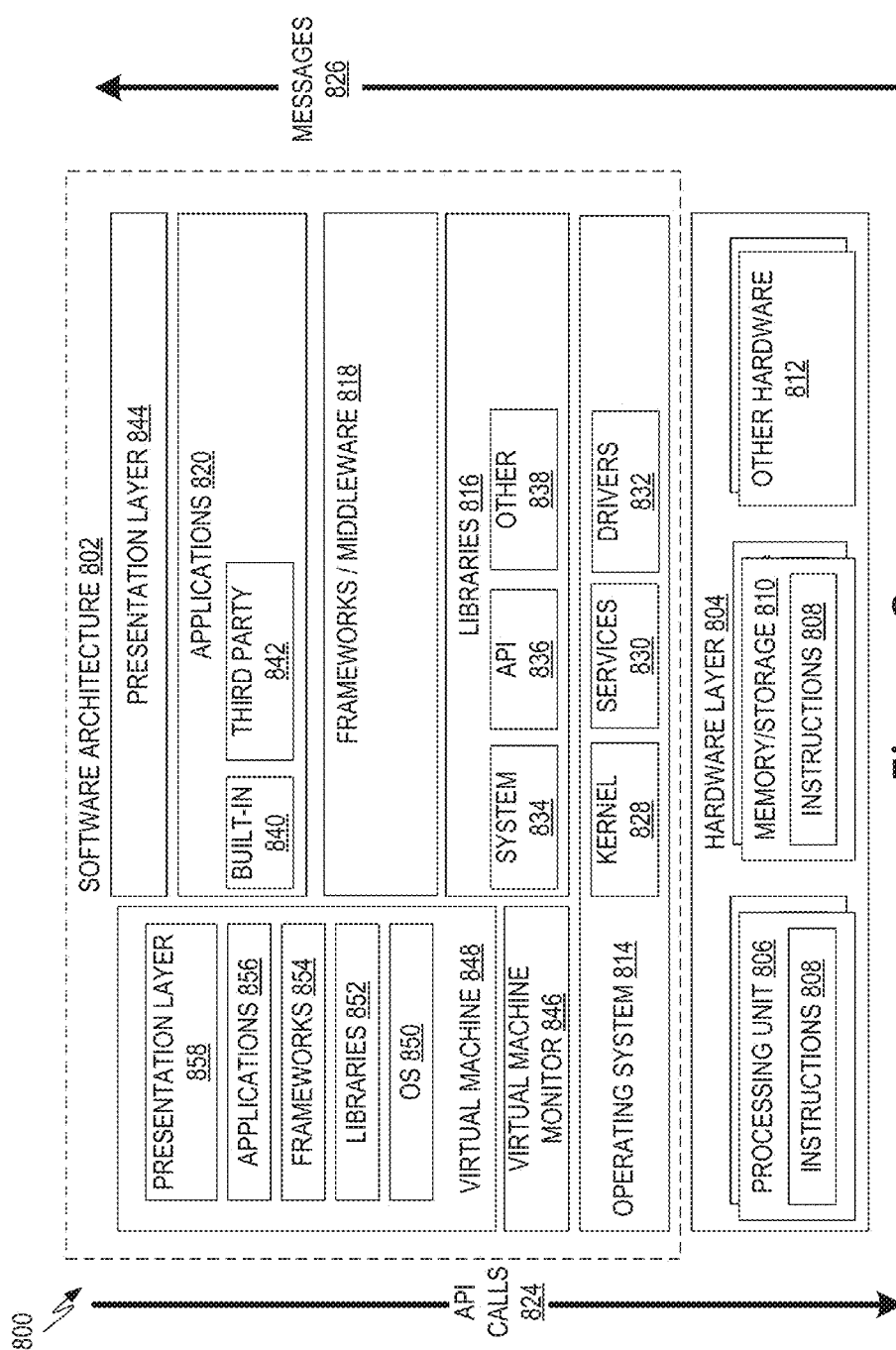
FIG. 8 is a block diagram illustrating an example software architecture, which may be used in conjunction with various hardware architectures herein described to provide a gaming engine and/or components of the token exchange system.

FIG. 8 is a block diagram 800 illustrating an example software architecture 802, which may be used in conjunction with various hardware architectures herein described to provide a gaming engine 701 and/or components of the token exchange system 200. FIG. 8 is a non-limiting example of a software architecture and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 having associated executable instructions 808. The executable instructions 808 represent the executable instructions of the software architecture 802, including implementation of the methods, modules and so forth described herein. The hardware layer 804 also includes memory/storage 810, which also includes the executable instructions 808. The hardware layer 804 may also comprise other hardware 812.

In the example architecture of FIG. 8, the software architecture 802 may be conceptualized as a stack of layers where each layer provides particular functionality. For example, the software architecture 802 may include layers such as an operating system 814, libraries 816, frameworks or middleware 818, applications 820 and a presentation layer 844. Operationally, the applications 820 and/or other components within the layers may invoke application programming interface (API) calls 824 through the software stack and receive a response as messages 826. The layers illustrated are representative in nature and not all software architectures have all layers. For example, some mobile or special purpose operating systems may not provide the frameworks/middleware 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 may provide a common infrastructure that may be used by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) provide a higher-level common infrastructure that may be used by the applications 820 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 842 may invoke the API calls 824 provided by the mobile operating system such as operating system 814 to facilitate functionality described herein.

The applications 820 may use built-in operating system functions (e.g., kernel 828, services 830 and/or drivers 832), libraries 816, or frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with a user.

Some software architectures use virtual machines. In the example of FIG. 8, this is illustrated by a virtual machine 848. The virtual machine 848 creates a software environment where applications/modules can execute as if they were executing on a hardware machine (such as the machine 900 of FIG. 9, for example). The virtual machine 848 is hosted by a host operating system (e.g., operating system 814) and typically, although not always, has a virtual machine monitor 846, which manages the operation of the virtual machine 848 as well as the interface with the host operating system (i.e., operating system 814). A software architecture executes within the virtual machine 848 such as an operating system (OS) 850, libraries 852, frameworks 854, applications 856, and/or a presentation layer 858. These layers of software architecture executing within the virtual machine 848 can be the same as corresponding layers previously described or may be different.

Figure 9:
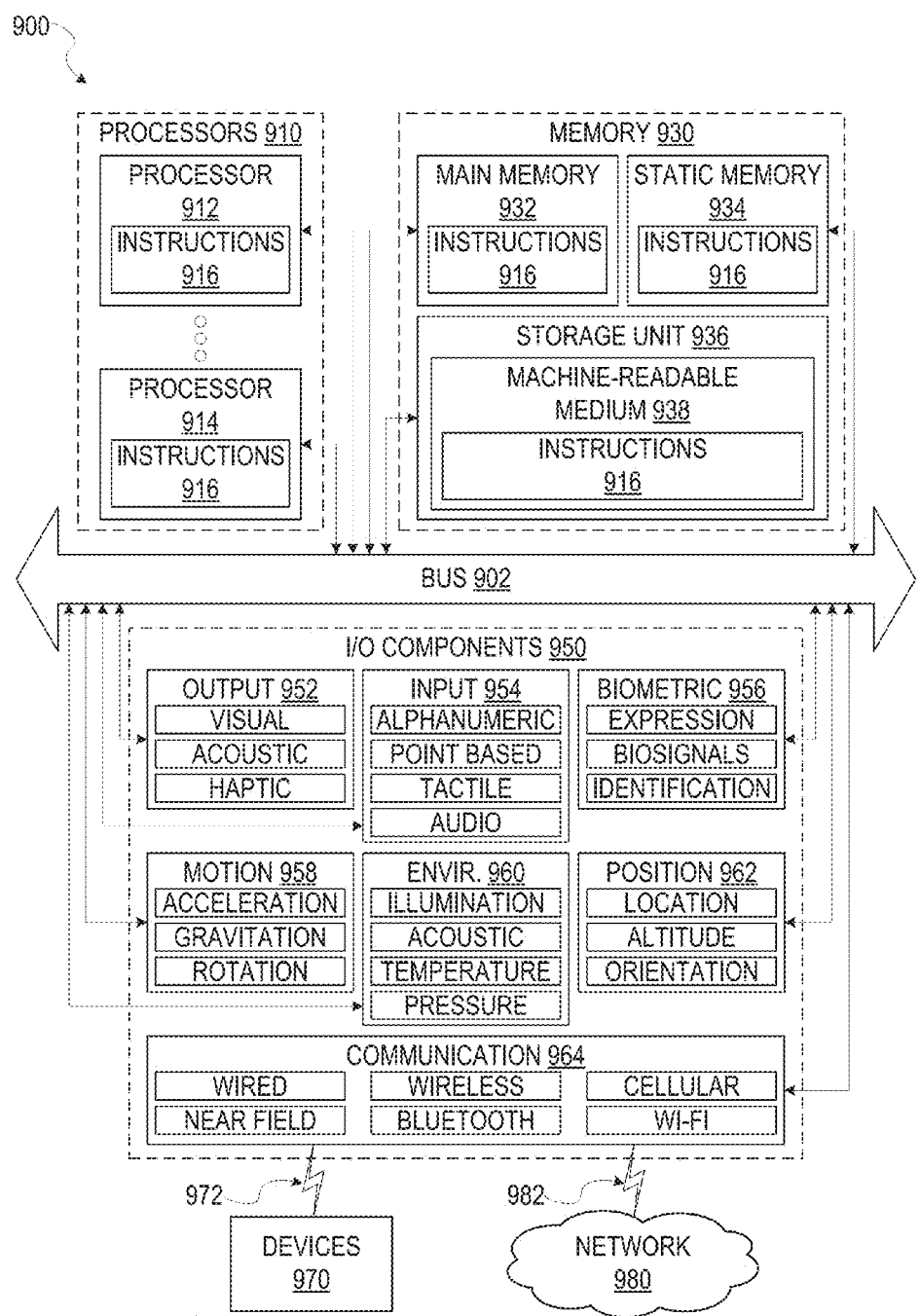
FIG. 9 is a block diagram illustrating components of a machine, according to some example embodiments, configured to read instructions from a machine-readable medium (e.g., a machine-readable storage medium) and perform any one or more of the methodologies discussed herein.

FIG. 9 is a block diagram illustrating components of a machine 900, according to some example embodiments, configured to read instructions from a machine-readable medium (e.g., a machine-readable storage medium) and perform any one or more of the methodologies discussed herein. In some embodiments, the machine 110 is similar to the HMD 102. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. As such, the instructions 916 may be used to implement modules or components described herein. The instructions transform the general, non-programmed machine into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines that individually or jointly execute the instructions 916 to perform any one or more of the methodologies discussed herein.

The machine 900 may include processors 910, memory 930, and input/output (I/O) components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 912 and a processor 914 that may execute the instructions 916. The term "processor" is intended to include multi-core processor that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core processor), multiple processors with a single core, multiple processors with multiples cores, or any combination thereof.

The memory/storage 930 may include a memory, such as a main memory 932, a static memory 934, or other memory, and a storage unit 936, both accessible to the processors 910 such as via the bus 902. The storage unit 936 and memory 932, 934 store the instructions 916 embodying any one or more of the methodologies or functions described herein. The instructions 916 may also reside, completely or partially, within the memory 932, 934, within the storage unit 936, within at least one of the processors 910 (e.g., within the processor's cache memory), or any suitable combination thereof, during execution thereof by the machine 900. Accordingly, the memory 932, 934, the storage unit 936, and the memory of processors 910 are examples of machine-readable media 938.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 950 may include a wide variety of components to receive input, provide output, produce output, transmit information, exchange information, capture measurements, and so on. The specific input/output (I/O) components 950 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 950 may include many other components that are not shown in FIG. 9. The input/output (I/O) components 950 are grouped according to functionality merely for simplifying the following discussion and the grouping is in no way limiting. In various example embodiments, the input/output (I/O) components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 950 may include communication components 964 operable to couple the machine 900 to a network 980 or devices 970 via a coupling 982 and a coupling 972 respectively. For example, the communication components 964 may include a network interface component or other suitable device to interface with the network 980. In further examples, the communication components 964 may include wired communication components, wireless communication components, cellular communication components, Near Field Communication (NFC) components, Bluetooth® components (e.g., Bluetooth Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 962, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:

1. A system comprising:
   one or more hardware processors in networked communication with a mobile computing device of a first user, the first user having a first unique user identifier (ID), the mobile computing device providing a mixed reality (MR) environment to the first user, the MR environment being additionally experienced by a group of users including a second user; and
   a token exchange module, executable by the one or more hardware processors, configured to perform operations comprising:
      creating a uniquely identified first digital token, the first digital token being configured to be solely possessed by a single user, the first digital token including an owner ID field identifying a current possessor of the digital token;
      associating the first digital token with digital content, the digital content includes content presented to the first user in the mixed reality environment;
      presenting the digital content associated with the first digital token to the group of users within the MR environment;
      making the first digital token available for acquisition by users of the group of users via the MR environment;
      receiving, from the mobile computing device of the first user, a request to acquire the first digital token;
      assigning possession of the first digital token, via the owner ID field, to the first unique user ID of the first user based on the request to acquire the first digital token;
      receiving a request to transfer the first digital token from the first user to the second user, the second user having a second unique user ID; and
      changing the owner ID field to the second unique user ID based on the request to transfer.

2. The system of claim 1, the operations further comprising:
   receiving, from a third user, a request to broadcast availability of a second digital token for acquisition by users of the group of users; and
   presenting, via the MR environment, availability of the second digital token for acquisition.

3. The system of claim 1, wherein the first digital token includes one or more of an inbound connection and an outbound connection to one or more other digital tokens.

4. The system of claim 1, wherein the first digital token includes a transform function configured to modify the first digital token upon occurrence of an event.

5. The system of claim 1, the operations further comprising creating a second digital token associated with the first digital token, the digital content of the second digital token including a link to the digital content of the first digital token.

6. The system of claim 5, wherein creating the second digital token is initiated based on receiving a request to duplicate the first digital token.

7. The system of claim 1, wherein the first digital token is grouped with other digital tokens based at least in part on one or more of geospatial area, token attributes, and links between tokens.

8. A computer-implemented method comprising:
   creating a uniquely identified first digital token, the first digital token being configured to be solely possessed by a single user, the first digital token including an owner ID field identifying a current possessor of the digital token;
   associating the first digital token with digital content, the digital content includes content presented to the first user in a mixed reality (MR) environment, the MR environment being additionally experienced by a group of users including a second user;
   presenting the digital content associated with the first digital token to the group of users within the MR environment;
   making the first digital token available for acquisition by users of the group of users via the MR environment;
   receiving, from the mobile computing device of a first user, a request to acquire the first digital token, the first user having a first unique user identifier (ID);
   assigning possession of the first digital token, via the owner ID field, to the first unique user ID of the first user based on the request to acquire the first digital token;
   receiving a request to transfer the first digital token from the first user to the second user, the second user having a second unique user ID; and
   changing the owner ID field to the second unique user ID based on the request to transfer.

9. The method of claim 8, further comprising:
receiving, from a third user, a request to broadcast availability of a second digital token for acquisition by users of the group of users; and
presenting, via the MR environment, availability of the second digital token for acquisition.

10. The method of claim 8, wherein the first digital token includes one or more of an inbound connection and an outbound connection to one or more other digital tokens.

11. The method of claim 8, wherein the first digital token includes a transform function configured to modify the first digital token upon occurrence of an event.

12. The method of claim 8, further comprising creating a second digital token associated with the first digital token, the digital content of the second digital token including a link to the digital content of the first digital token.

13. The method of claim 12, wherein creating the second digital token is initiated based on receiving a request to duplicate the first digital token.

14. The method of claim 8, wherein the first digital token is grouped with other digital tokens based at least in part on one or more of geospatial area, token attributes, and links between tokens.

15. A non-transitory machine-readable medium storing processor-executable instructions which, when executed by a processor, cause the processor to perform operations comprising:
creating a uniquely identified first digital token, the first digital token being configured to be solely possessed by a single user, the first digital token including an owner ID field identifying a current possessor of the digital token;
associating the first digital token with digital content, the digital content includes content presented to the first user in a mixed reality (MR) environment, the MR environment being additionally experienced by a group of users including a second user;
presenting the digital content associated with the first digital token to the group of users within the MR environment;
making the first digital token available for acquisition by users of the group of users via the MR environment;
receiving, from the mobile computing device of a first user, a request to acquire the first digital token, the first user having a first unique user identifier (ID);
assigning possession of the first digital token, via the owner ID field, to the first unique user ID of the first user based on the request to acquire the first digital token;
receiving a request to transfer the first digital token from the first user to the second user, the second user having a second unique user ID; and
changing the owner ID field to the second unique user ID based on the request to transfer.

16. The non-transitory machine-readable medium of claim 15, the operations further comprising:
receiving, from a third user, a request to broadcast availability of a second digital token for acquisition by users of the group of users; and
presenting, via the MR environment, availability of the second digital token for acquisition.

17. The non-transitory machine-readable medium of claim 15, wherein the first digital token includes one or more of an inbound connection and an outbound connection to one or more other digital tokens.

18. The non-transitory machine-readable medium of claim 15, wherein the first digital token includes a transform function configured to modify the first digital token upon occurrence of an event.

19. The non-transitory machine-readable medium of claim 15, the operations further comprising:
receiving a request to duplicate the first digital token; and
creating a second digital token associated with the first digital token, the digital content of the second digital token including a link to the digital content of the first digital token.

20. The non-transitory machine-readable medium of claim 15, wherein the first digital token is grouped with other digital tokens based at least in part on one or more of geospatial area, token attributes, and links between tokens.

* * * * *